(12) United States Patent
Gallegos-Lopez et al.

(10) Patent No.: US 8,990,277 B2
(45) Date of Patent: Mar. 24, 2015

(54) METHOD FOR SEARCHING A LOOKUP TABLE

(75) Inventors: Gabriel Gallegos-Lopez, Lomita, CA (US); Michael H. Kinoshita, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 360 days.

(21) Appl. No.: 13/466,746

(22) Filed: May 8, 2012

(65) Prior Publication Data

US 2013/0304782 A1 Nov. 14, 2013

(51) Int. Cl.
*G06F 1/02* (2006.01)
*G06F 17/30* (2006.01)
*G06K 9/48* (2006.01)

(52) U.S. Cl.
CPC ............ *G06F 17/30952* (2013.01); *G06K 9/48* (2013.01)
USPC .......................................... 708/272; 708/274

(58) Field of Classification Search
CPC .................................. G06F 1/03; G06F 1/035
USPC .......................................... 708/270, 272, 274
See application file for complete search history.

(56) References Cited

U.S. PATENT DOCUMENTS

| | | | |
|---|---|---|---|
| 7,085,792 B2* | 8/2006 | Wei et al. ................ | 708/272 |
| 8,054,912 B2* | 11/2011 | Ba et al. .................. | 375/297 |
| 2003/0074384 A1* | 4/2003 | Parviainen ............... | 708/654 |
| 2007/0124354 A1* | 5/2007 | Lee et al. ................ | 708/200 |
| 2008/0036783 A1* | 2/2008 | Kulkarni .................. | 345/582 |

* cited by examiner

*Primary Examiner* — Chuong D Ngo
(74) *Attorney, Agent, or Firm* — Ingrassia Fisher & Lorenz, P.C.

(57) ABSTRACT

Methods and apparatus are provided in which a computed vector index (CVI) can be generated/computed based on an input value being searched for within an index vector of a lookup table. When the CVI is greater than a length of an index vector, the CVI can be re-computed to generate a re-computed vector index (RVI). When the value of the CVI is determined to be correct, or when the RVI is generated, an interpolation routine for a linearly indexed index vector can be executed using a presently computed vector index (e.g., either the CVI or the RVI) to determine an interpolated output value that corresponds to the input value. By contrast, when the value of the CVI is determined to be incorrect, an interpolation routine for a piecewise indexed index vector can be executed to determine the interpolated output value.

23 Claims, 4 Drawing Sheets

METHOD FOR SEARCHING A LOOKUP TABLE

TECHNICAL FIELD

The technical field generally relates to lookup tables, and more particularly relates to searching a lookup table for a vector index that corresponds to an input value, and determining an output value that corresponds to the input value.

BACKGROUND

Systems, such as mechanical and/or electronic systems, are often analyzed to determine mathematical relationships among the system's inputs, states, and outputs. Once this information has been obtained, it can be used to create lookup tables that characterize the behavior of the system. A lookup table is a data structure, such as an array or associative array, which is often used to replace a runtime computation with a simpler array indexing operation.

Lookup tables can be generated by collecting input and output data for a static or dynamic system. This can be done artificially, via simulation, or experimentally by testing an actual system. In a system with M inputs and N outputs, a set of N, M-dimensional lookup tables can be used to characterize the behavior of the system. For a system with N output data values, N array elements are located and the corresponding data are stored at these locations.

Once a set of lookup tables is created based on system input and output data, it can be stored in computer memory so that the corresponding array of values can be used in applications without the need for regenerating the system output data. Only the input data is required to locate the appropriate array elements in the lookup table, and the approximate system output data can be read from these locations. As such, the use of lookup tables can provide a significant savings in terms of processing time since retrieving a value from memory is often faster than undergoing an extensive computation or input/output operation in real-time.

Lookup tables capture an input-output mapping of the system in the form of numeric data that can be stored at predetermined array locations. A lookup table implements an array of table data (sometimes referred to as "elements") and maps the table data/elements to a domain of indexed values at which the table has been evaluated for a given index. These indexed values serve to partition the table input space into regions referred to as "cells," where each cell is delimited by two "breakpoints" to define an interval or segment into which an input value may fall.

A one-dimensional lookup table includes an index vector and a corresponding output vector. Each vector consists of a number of cells used to store values. The index vector comprises a set of discrete input values, and the output vector includes a series of corresponding output values such that each cell of the index vector is associated with a corresponding cell of the output vector. Each of the values of the index vector and the output vector are associated with or evaluated at a corresponding vector index which is typically an integer value.

In most cases, an input value into the lookup table can fall anywhere within a particular cell of the index vector (e.g., the input value may fall between two breakpoints that define a particular cell of an index vector). For a particular index vector, a search can be performed to identify the two cells of the index vector that are closest in value to the input value. For example, a processor determines the location of the input value relative to one of the intervals to identify the cells of the input vector and their corresponding numeric table data values.

Once the cells of the index vector have been identified, the corresponding cells of an output vector are known. The processor can then execute an interpolation algorithm based on the values of cells it has identified to interpolate between table data values to determine an output value that corresponds to the input value.

An index vector can be either linearly indexed or piecewise indexed. For a linearly index vector, the difference between any two consecutive cells is always the same. By contrast, for a piecewise indexed index vector, the index vector is indexed in a "piecewise" manner, meaning that cells are sometimes unevenly spaced such that a difference between one group of two consecutive cells of the piecewise indexed index vector is different than a difference between another group of two consecutive cells of the piecewise indexed index vector.

The method for searching the index vector to identify the cells of the index vector (that are closest in value to the input value) varies depending on whether the index vector is linearly indexed or piecewise indexed. For example, when the index vector is known to be linear, a search algorithm can be employed in which linear interpolation is calculated using the slope based on the difference between a group of two consecutive cells, and a computed index. By contrast, when the index vector is known to be piecewise indexed, a search algorithm can be employed in which the index vector is searched sequentially (i.e., on a cell-by-cell basis) from the beginning of the index vector until the index is found. This method for searching a piecewise indexed index vector consumes a significant amount of processor throughput.

Accordingly, it is desirable to provide improved methods and systems for searching an index vector of a lookup table for a vector index to identify the cells of the index vector that correspond to and are closest in value to the input value so that an output value (corresponding to the input value) can be determined. It would be desirable if these improved methods and systems can be used regardless of whether the index vector is linearly indexed or piecewise indexed. Furthermore, other desirable features and characteristics of the present invention will become apparent from the subsequent detailed description and the appended claims, taken in conjunction with the accompanying drawings and the foregoing technical field and background.

SUMMARY

A method is provided that can be performed by a computer processor in conjunction with a lookup table.

Based on an input value being searched for within an index vector of the lookup table, a value of a vector index can be computed to generate a computed vector index. In some embodiments, it can be determined whether the computed vector index is less than a length of an index vector and, if not, then the computed vector index can be re-computed by decrementing the length of the index vector by one to generate a re-computed vector index.

It can then be determined whether the value of the computed vector index is correct to determine whether the index vector is linearly indexed or piecewise indexed.

When either the value of the computed vector index is determined to be correct, or when the re-computed vector index is generated, an interpolation routine for a linearly indexed index vector can be executed using a presently computed vector index to determine an interpolated output value that corresponds to the input value. The presently computed vector index can be either the computed vector index or the re-computed vector index.

By contrast, when the value of the computed vector index is determined to be incorrect, the index vector is determined to be piecewise indexed, and an interpolation routine for a piecewise indexed index vector can be executed to determine the interpolated output value that corresponds to the input value.

DESCRIPTION OF THE DRAWINGS

The embodiments will hereinafter be described in conjunction with the following drawing figures, wherein like numerals denote like elements, and wherein.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to searching an index vector of a lookup table for a vector index that corresponds to an input value, and then computing a slope that can be used in conjunction with the input value and the computed vector index to determine a corresponding output value. It will be appreciated that embodiments of the invention described herein can be implemented using hardware, software or a combination thereof. It will be appreciated that embodiments of the invention described herein may be comprised of one or more conventional processors and unique stored program instructions that control the one or more processors to implement, in conjunction with certain non-processor circuits, some, most, or all of the functions for searching an index vector of a lookup table for a vector index that corresponds to an input value, and then computing a slope that can be used in conjunction with the input value and the computed vector index to determine a corresponding output value, as described herein. As such, these functions may be interpreted as steps of a method for searching an index vector of a lookup table for a vector index that corresponds to an input value, and then computing a slope that can be used in conjunction with the input value and the computed vector index to determine a corresponding output value.

Figure 1:
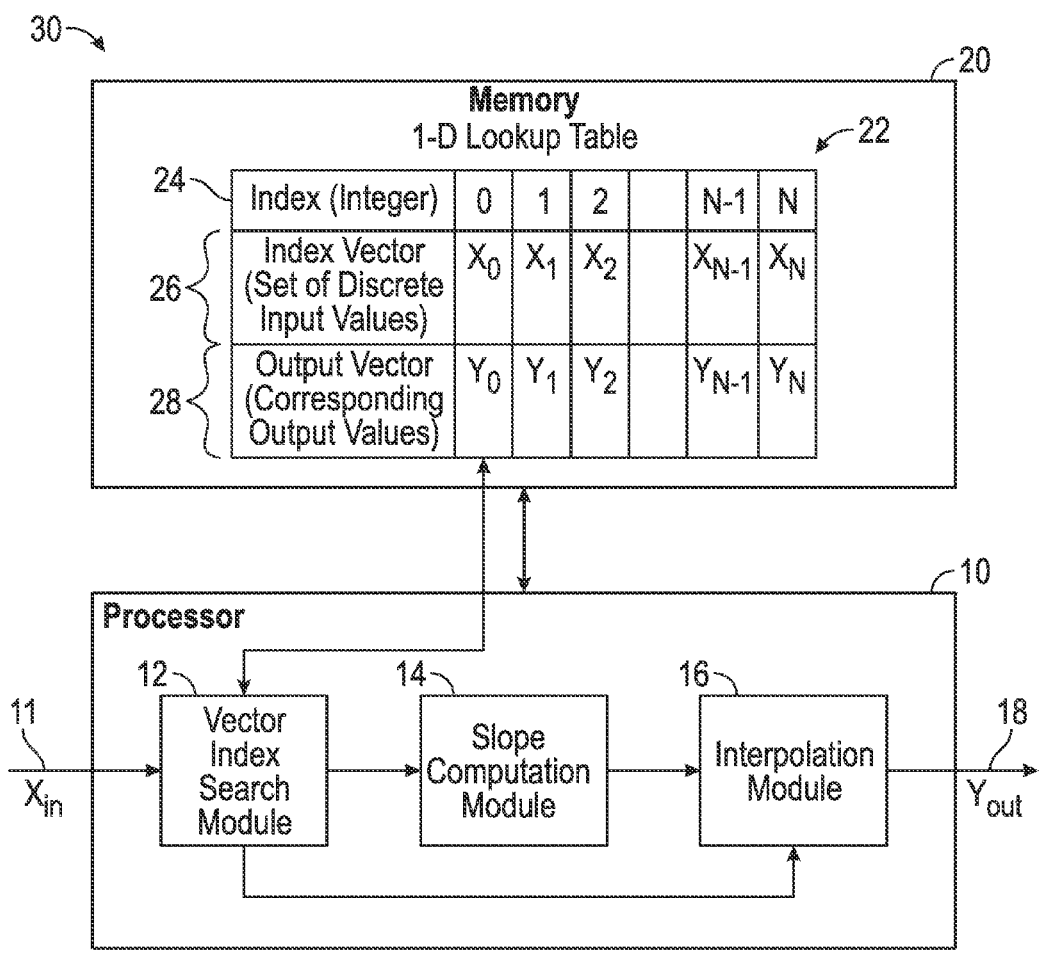
FIG. 1 is a block diagram of a system in accordance with an embodiment.

FIG. 1 is a block diagram of a system 30 in accordance with one embodiment of the present invention. The system 30 includes processor 10 and a memory 20 that are coupled to and in communication with each other.

The memory 20 includes a lookup table 22. The lookup table 22 is used to store information including an index vector (X) 26 and a corresponding output vector (Y) 28. Each vector 26, 28 includes a number of cells used to store values. Each of the values of the index vector (X) 26 and the output vector (Y) 28 are associated with or evaluated at a corresponding vector index that is an integer value ranging from zero to N, where N is the length of the vector.

The index vector (X) 26 comprises a set of discrete input values X0 through XN, and the output vector (Y) 28 comprises a series of corresponding output values Y0 through YN. For example, the index vector comprises a number of cells (X0 . . . XN), and can be represented as follows:

$$\text{IndexVector} = [X0, X1, X2, X3, \ldots, XN],$$

where the digit portion of X0, X1, etc. corresponds to an index, which has a range from 0 to N. As such, cell zero (X0) is the first cell of the index vector (X) 26 and includes the value of the index vector (X) 26 evaluated at index 0 (X0=IndexVector(0)), and cell N (XN) is the last cell of the index vector (X) 26 and includes the value of the index vector (X) 26 evaluated at index N (XN=IndexVector(N)). Likewise, cell zero (Y0) is the first cell of the output vector (Y) 28 and includes the value of the output vector (Y) 28 evaluated at index 0 (Y0=OutputVector(0)), and cell N (YN) is the last cell of the output vector (Y) 28 and includes the value of the output vector (Y) 28 evaluated at index N (YN=OutputVector(N)).

The index vector (X) 26 can be either linearly indexed or piecewise indexed. For a linearly indexed index vector (X) 26, the cells are evenly spaced such that the difference between any two consecutive cells of the linearly indexed index vector (X) 26 is always the same. By contrast, for a piecewise indexed index vector (X) 26, cells of a piecewise indexed index vector (X) 26 are unevenly spaced such that a difference between the two consecutive cells of the piecewise indexed index vector (X) 26 is different than a difference between another two consecutive cells of the piecewise indexed index vector (X) 26.

The processor 10 includes a vector index search module 12 that searches the lookup table 22 to either compute or find a vector index that corresponds to an input value (Xin) 11, a slope computation module 14 that computes one or more slope values based on a vector index provided from the vector index search module 12, and an interpolation module 16 that generates an output value (Yout) 18 based on one of the computed slope values and information provided from the vector index search module 12. As used herein the term "module" refers to a device, a circuit, an electrical component, and/or a software based component for performing a task. Further details will now be described below.

The vector index search module 12 initially assumes that the index vector is linearly indexed and computes a vector index based on the input value (Xin) 11. The vector index search module 12 determines whether the computed vector index (CVI) falls within the range or length (N) of the index vector 26. If not, the vector index search module 12 re-computes the vector index by decrementing it by one to generate a re-computed vector index (RVI).

If the vector index search module 12 determines that the vector index is within the length range (N) of the index vector, the vector index search module 12 then determines whether the index vector (X) 26 is linearly indexed by determining whether the input value (Xin) 11 is within values of particular cells of the index vector (X) 26.

When the vector index search module 12 determines that the index vector is linearly indexed and that the vector index (CVI) that was initially computed is correct, the vector index search module 12 determines whether an initially computed slope or "first" slope is correct. The first slope is computed by the slope computation module 14 based on a presently computed vector index which can be either the computed vector index (CVI) or the re-computed vector index (RVI).

When the vector index search module 12 determines that the first slope is correct, the interpolation module 16 uses the presently computed vector index and the first slope to interpolate an output value (Yout) 18. By contrast, when the vector index search module 12 determines that the first slope is incorrect, the slope computation module 14 computes a second slope, and the interpolation module 16 uses the input value (Xin) 11, the presently computed vector index, and the second slope to interpolate an output value (Yout) 18.

On the other hand, when the vector index search module 12 determines that the index vector (X) 26 is not linearly indexed and that the computed vector index (CVI) is incorrect, the vector index search module 12 will then presume that the index vector (X) 26 is a piecewise indexed index vector, and will do a search, depending on the value of the first slope, to find a new vector index, which will be referred to below as a found vector index (FVI). Once the vector index search module 12 finds the new, found vector index (FVI), the slope computation module 14 uses the input value (Xin) 11 and the found vector index to compute a third slope, and the interpolation module 16 uses input value (Xin) 11, the third slope, and the found vector index to interpolate an output value (Yout) 18.

Figure 2:
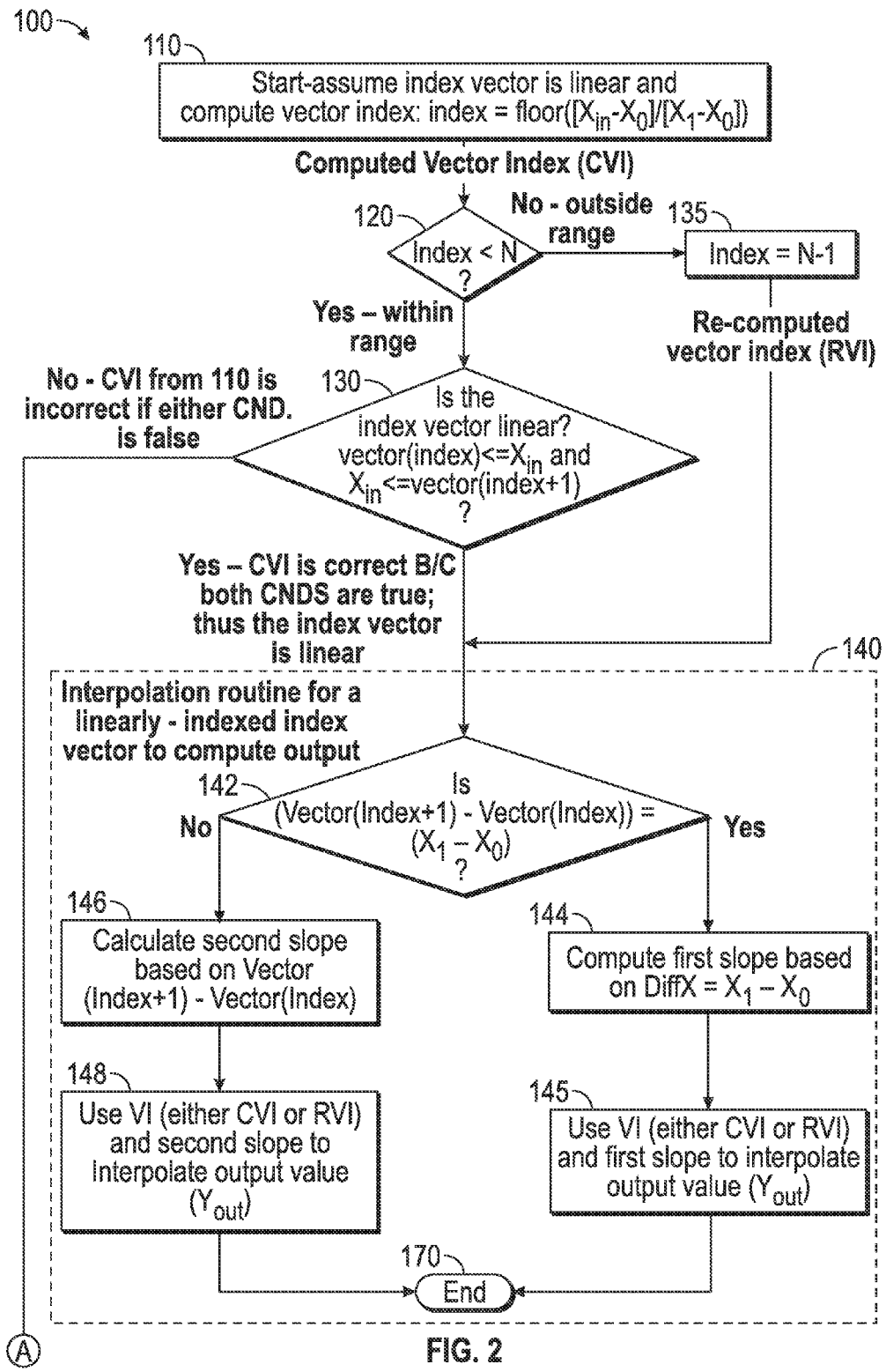
FIG. 2 is a flow chart illustrating a method in accordance with an embodiment.
Figure 2:
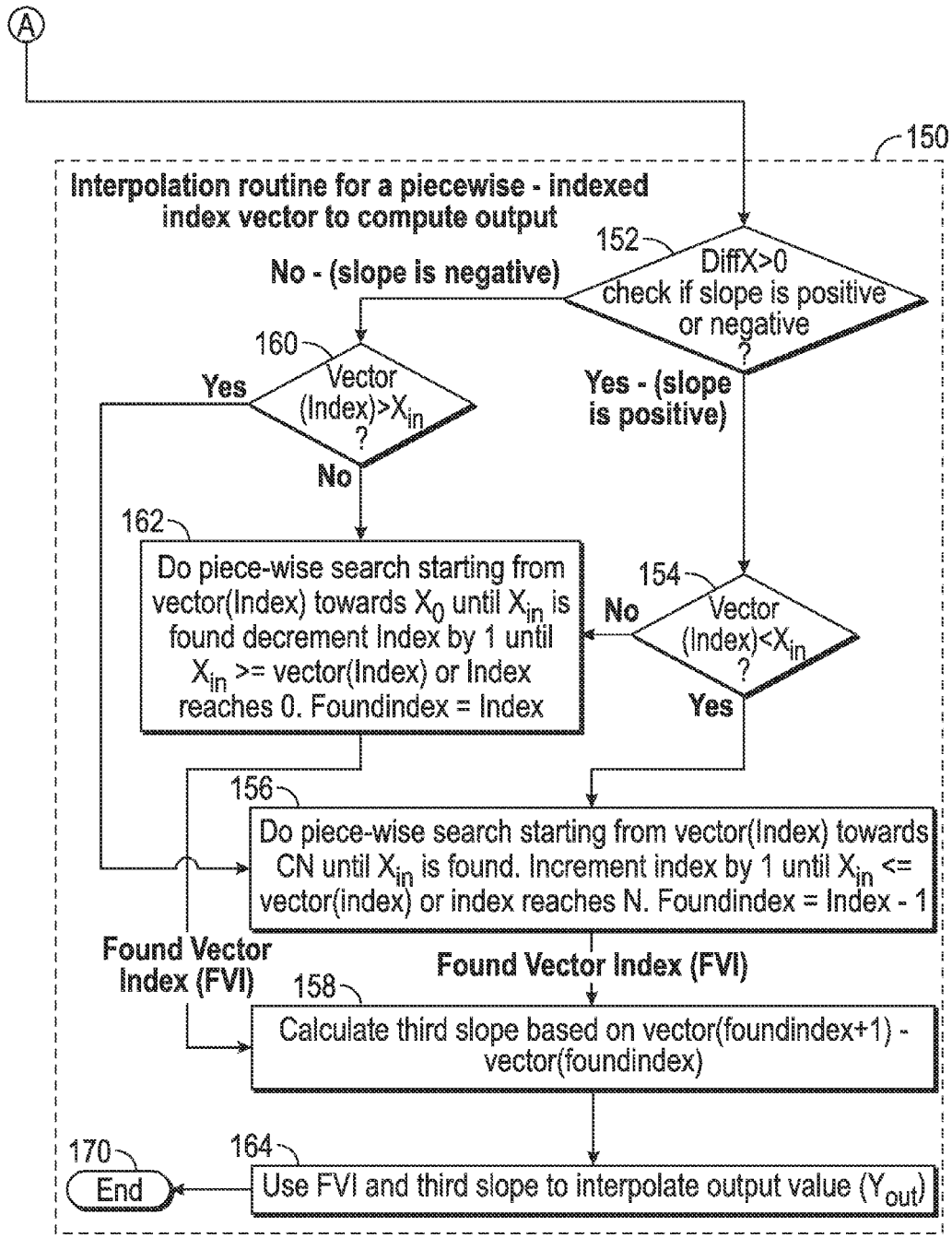

FIG. 2 is a flow chart illustrating a method 100 for searching an index vector (X) 26 of a lookup table 22 for a vector index that corresponds to an input value (Xin), and then computing a slope that can be used in conjunction with the input value (Xin) and the vector index to determine a corresponding output value (Yout) in accordance with some of the disclosed embodiments. FIG. 2 will be described with reference to the lookup table 22 in FIG. 1.

Figure 3:
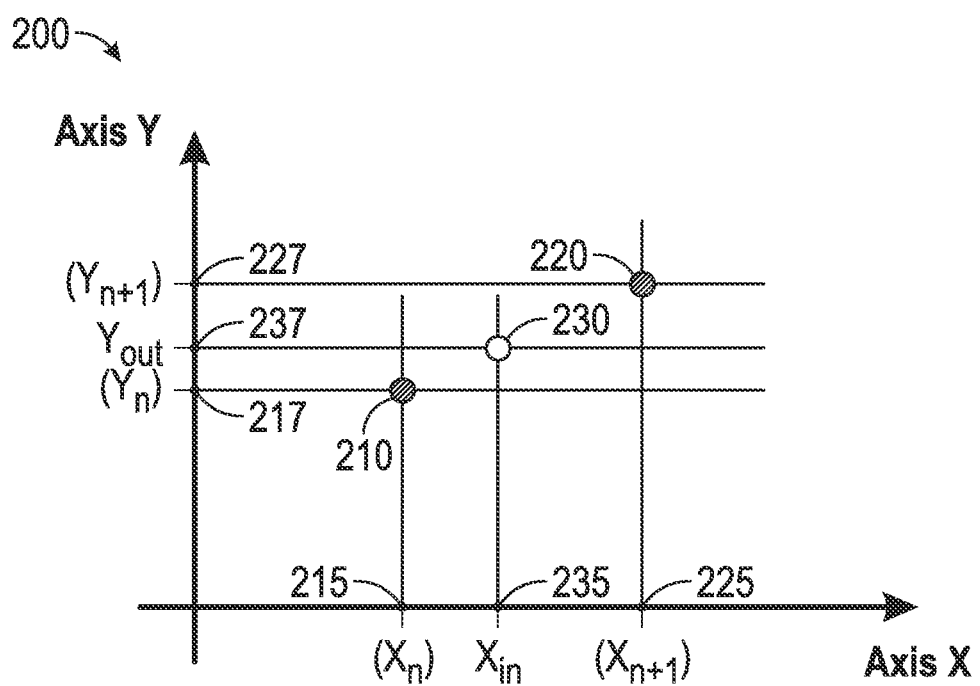
FIG. 3 is a graph that illustrates interpolation in accordance with an embodiment.

FIG. 3 is a graph that illustrates interpolation in accordance with an embodiment. FIG. 3 illustrates three points 210, 220, 230, where: point 210 represents a value of a cell ($X_n$) of the index vector (X) 26 and a corresponding value of a cell ($Y_n$) of the output vector (Y) 28; point 220 represents a value of an adjacent cell ($X_{n+1}$) of the index vector (X) 26 and a corresponding value of a cell ($Y_{n+1}$) of the output vector (Y) 28; and point 230 represents the input value ($X_{in}$) and its corresponding output value ($Y_{out}$) that is being searched for. Here, the notation $X_n$ is used to indicate a value of cell n of the index vector (X) 26 (i.e., the value of the index vector (X) 26 evaluated at index n), whereas the notation $X_{n+1}$ is used to indicate a value of cell n+1 of the index vector (X) (i.e., the value of the index vector (X) 26 evaluated at index n+1). Similarly, the notation $Y_n$ is used to indicate a value of cell n of the output vector (Y) 28 (i.e., the value of the output vector (Y) 28 evaluated at index n), whereas the notation $Y_{n+1}$ is used to indicate a value of cell n of the output vector (Y) 28 (i.e., the value of the output vector (Y) 28 evaluated at index n+1). FIG. 2 will be described below with reference to FIG. 3.

Method 100 allows for the output vector to be searched regardless of whether it is linearly indexed or piecewise indexed.

Method 100 begins at step 110, where a vector index is computed. At step 110, it is assumed that there is an even spacing between consecutive cells (i.e., that the output vector (Y) 28 is linear). In one embodiment, the value of the vector index can be computed using equation (1) as follows:

$$\text{Index}=\text{floor}([Xin-X0]/[X1-X0]) \quad (1),$$

where Xin is an input value being searched for within the index vector (X) (or "searched value"). The floor function returns the integer portion of the computation. The difference between two consecutive cells of the input vector (X) will be referred to as cell difference (DiffX). The cell difference is initially presumed to be linear. In one embodiment, the cell difference (DiffX) can be computed per equation (2) as follows:

$$\text{DiffX}=X1-X0 \quad (2)$$

Thus, in one embodiment of step 110, a ratio of: (1) a difference between the input value (Xin) 230 being searched for within the index vector (X) and a value of a first cell (X0) of the index vector (X); to (2) the cell difference (DiffX) between two consecutive cells of the index vector (X) is computed, and the integer portion of that ratio is the value of the computed vector index (CVI). The value of the computed vector index (from step 110) can be used to determine whether the index vector (X) 26 is linearly indexed or piecewise indexed.

At step 120, it is determined whether the computed vector index (from step 110) is less than the length of the index vector (N).

When it is determined that the computed vector index (from step 110) is greater than or equal to the length of the index vector (N), the method 100 proceeds to step 135, where the computed vector index is re-computed by decrementing the length of the index vector (N) by one to generate a re-computed vector index, and the method 100 then proceeds to block 140. In other words, the re-computed vector index is set to a value N−1 (Index=N−1).

By contrast, when the index is determined to be less than N (at step 120), this means that the computed vector index (from step 110) is within the maximum length (N) of the index vector, and the method 100 proceeds to step 130.

At step 130, it is determined whether the index vector (X) 26 is either linearly indexed or piecewise indexed by determining whether the computed vector index (from step 110) is correct. To do so, in one embodiment, it is determined whether the input value (Xin) is between: (1) a first value of the index vector (X) 26 evaluated the computed vector index; and (2) a second value of the index vector (N) 26 evaluated at the computed vector index incremented by one. This can be represented in equation (3) as follows:

$$\text{IndexVector(Index)} \leq Xin \text{ AND } Xin \leq \text{IndexVector(Index+1)}? \quad (3)$$

In equation (3), it is determined whether the value of the index vector (X) 26 evaluated at the index is less than or equal to the input value (Xin), and whether the input value (Xin) is less than or equal to the value of the index vector (X) 26 evaluated at index +1.

When it is determined that the input value (Xin) is between: (1) the first value of the index vector (X) 26 evaluated the computed vector index; and (2) the second value of the index vector (N) 26 evaluated at the computed vector index incremented by one, the index vector (X) 26 is determined to be linearly indexed. By contrast, when it is determined that the input value (Xin) is not between: (1) the first value of the index vector (X) 26 evaluated the computed vector index; and (2) the second value of the index vector (N) 26 evaluated at the computed vector index incremented by one, the index vector (X) 26 is determined to be piecewise indexed.

Interpolation Routine For A linearly indexed Index Vector

When it is determined (at step 130) that both conditions are satisfied (or true), then the computed vector index (from step 110) is determined to be correct, which means that the index vector (X) 26 is purely linear, and the method 100 proceeds to block 140 where an interpolation routine for a linearly indexed index vector is executed.

The interpolation routine 140 for a linearly indexed index vector begins at step 142.

The vector index provided to block 142 can be either the computed vector index (from step 110) or re-computed vector index (from step 135), and will be referred to below as a presently computed vector index.

At step 142, it can be determined whether a first condition is satisfied, namely, whether (1) a difference between the value of the index vector evaluated at the presently computed vector index +1 (IndexVector(Presentlycomputedvectorindex+1)) and the value of the index vector evaluated at the presently computed vector index (IndexVector(Presentlycomputedvectorindex)), is equal to, (2) the a cell difference (e.g., difference between value of cell one (X1) of the input vector (X) and value of cell zero (X0) of the input vector (X)). This can be represented in equation (4) as follows:

$$\text{IndexVector(Presentlycomputedvectorindex+1)}-\text{IndexVector(Presentlycomputedvectorindex)}=\text{DiffX?} \quad (4)$$

If the first condition at 142 is determined to be true, this means that a first slope can be computed and used for interpolation. The method proceeds to step 144 where the first slope can be computed. In one embodiment, the first slope can be computed based on a ratio of (1) a cell difference between two consecutive cells of the index vector (e.g., difference between cell one (Y1) of the output vector (Y) and cell zero (Y0) of the output vector (Y) 28), and (2) a second difference between cell one (X1) of the input vector (X) and cell zero (X0) of the input vector (X). This can be represented in equation (5) as follows:

$$\text{First Slope}=(Y1-Y0)/(\text{DiffX}), \text{where DiffX}=X1-X0 \quad (5)$$

The method 100 then proceeds to step 145, where the presently computed vector index and the first slope are used to interpolate a value of the output (Yout) per equation (6) as follows:

$$Y\text{out}=\text{First Slope}\times(X\text{in}-\text{IndexVector(Presentlycomputedvectorindex)})+\text{OutputVector(Presentlycomputedvectorindex)} \quad (6)$$

where the first slope is computed as described above, IndexVector(Presentlycomputedvectorindex) is the index vector evaluated at the presently computed vector index, which is either the computed vector index (from step 110) or re-computed vector index (from step 135), Xin is the input value (Xin) that is being searched for, and Yout is the interpolated output value corresponding to the input value (Xin). Method 100 then ends at step 170.

When the condition at step 142 is determined to be false, this means that although the presently computed vector index (from step 110 or step 135) is correct, the first slope is not correct (this is an indirect determination at step 142 when false), and therefore the method proceeds to step 146 where a second slope is computed. In one embodiment, the second slope is computed based on a ratio of (1) a third difference between the value of the output vector (Y) 28 evaluated at the presently computed vector index plus 1 (OutputVector(Presentlycomputedvectorindex+1)), and the value of the output vector (Y) evaluated at the presently computed vector index (OutputVector(Presentlycomputedvectorindex)), and (2) a fourth difference between the value of the index vector evaluated at the presently computed vector index +1 (IndexVector(Presentlycomputedvectorindex+1)) and the index vector evaluated at the presently computed vector index (IndexVector(Presentlycomputedvectorindex)). The computation of the second slope can be represented in equation (7) as follows:

$$\text{Second Slope}=((\text{OutputVector(Presentlycomputedvectorindex+1)}-\text{OutputVector(Presentlycomputedvectorindex)})/(\text{IndexVector(Presentlycomputedvectorindex+1)}-\text{IndexVector(Presentlycomputedvectorindex)}) \quad (7)$$

The method 100 then proceeds to step 148, where the presently computed vector index and the second slope are used to interpolate a value of the output (Yout) per equation (8) as follows:

$$Y\text{out}=\text{Second Slope}\times(X\text{in}-\text{IndexVector(Presentlycomputedvectorindex)})+\text{OutputVector(Presentlycomputedvectorindex)} \quad (8)$$

where the second slope is computed as described above with respect to equation (7), and the other variables are described above with respect to equation (7). Again, Yout is the interpolated output value corresponding to the input value (Xin). Method 100 then ends at step 170.

Interpolation Routine For A Piecewise Indexed Index Vector

When it is determined (at step 130) that either one of the conditions are not satisfied (or false), then it is determined that the computed vector index (from step 110) is incorrect, which means that the index vector (X) 26 is quasi-linearly indexed (e.g., piecewise indexed), and the method 100 proceeds to block 150 where an interpolation routine for a piecewise indexed index vector is executed. In other words, when is determined at step 130 that either one of or both of the conditions are not true, then the method proceeds to step 150. As will be described below, at block 150, interpolation is performed based on a third slope and the third index.

The routine 150 begins at step 152 where it is determined whether the cell difference (DiffX) (e.g., difference between cell one (X1) of the input vector (X) and cell zero (X0) of the input vector (X)) is greater than zero (i.e., is positive or negative).

When it is determined (at step 152) that the cell difference (DiffX) is greater than zero (positive), the method 100 proceeds to step 154 where it is determined whether the index vector evaluated at the computed vector index (from step 110) (IndexVector(Index)) is less than the input value (Xin), which can expressed in expression (9) as follows:

$$\text{IndexVector(Index)}<X\text{in?} \quad (9)$$

If the index vector evaluated at the computed vector index (IndexVector(Index)) is determined to be greater than (or not less than) the input value (Xin), method 100 proceeds to step 162, where a first piecewise search is performed. The first piecewise search starts at the computed vector index (IndexVector(Index)) and decrements the vector index by one towards cell zero (X0) of the input vector (X) until a first found condition occurs at which point the new vector index is found, and the found vector index is reset to the new vector index that was found. In one embodiment, the first found condition occurs when the input value (Xin) is determined to be greater than or equal to the index vector evaluated at the computed vector index (CVI), or the vector index reaches zero (0). Thus, when either: the input value (Xin) is determined to be greater than or equal to the index vector evaluated at the computed vector index (IndexVector(Index)); or the vector index reaches zero (0), the new vector index is found and the value of a variable (FoundIndex) is reset to the vector index value that was found.

By contrast when the index vector evaluated at the computed vector index (IndexVector(Index)) is determined to be less than the input value (Xin), the method 100 proceeds to step 156, where a second piecewise search performed. The second piecewise search starts at the computed vector index (IndexVector(Index)), and the vector index is incremented by one towards cell N (XN) of the input vector (X) until a "second" found condition occurs at which point the new vector index is found, and the found vector index is reset to the new vector index that was found, minus one (1). In one embodiment, the second found condition occurs when either: the input value (Xin) is determined to be less than or equal to the value of the index vector evaluated at the computed vector index (IndexVector(Index)); or the value of the vector index reaches N, at which point the new vector index is found, and the value of a variable (FoundIndex) can be reset to the new vector index value that was found, minus 1.

When it is determined at step 152 that the cell difference (DiffX) is negative, the method 100 proceeds to step 160 where it is determined whether the index vector evaluated at the computed vector index (from step 110) (IndexVector(Index)) is greater than the input value (Xin), which can expressed in expression (10) as follows:

$$\text{IndexVector(Index)} > Xin? \tag{10}$$

If the index vector evaluated at the computed vector index (IndexVector(Index)) is determined to be less than the input value (Xin), method 100 proceeds to step 162, where the first piecewise search is performed as described above. By contrast, when the index vector evaluated at the computed vector index (IndexVector(Index)) is determined to be greater than the input value (Xin), the method 100 proceeds to step 156, where the second piecewise search is done as described above.

Following either step 156 or step 162, the method 100 proceeds to step 158. At step 158, a third slope is computed based on the index vector evaluated at the vector index found at step 156 or step 162 (IndexVector(FoundIndex)). In one embodiment, the computation performed to compute the third slope at step 158 can be represented in equation (11) as follows:

$$\text{Third Slope} = (\text{OutputVector(FoundIndex+1)} - \text{OutputVector(FoundIndex)}) / (\text{IndexVector(FoundIndex+1)} - \text{IndexVector(FoundIndex)}) \tag{11}$$

As shown in equation (11), the third slope is computed based on a ratio of (1) a fifth difference between the value of the output vector (Y) 28 evaluated at the found vector index plus 1 (OutputVector(FoundIndex+1)), and the value of the output vector (Y) 28 evaluated at the found vector index (OutputVector(FoundIndex)), and (2) a sixth difference between the value of the index vector evaluated at the found vector index +1 (IndexVector(FoundIndex+1)) and the index vector evaluated at the found vector index (IndexVector(FoundIndex)). It is noted that the value of FoundIndex comes from either block 162 or block 156, depending on which path was traversed through block 150.

The method 100 then proceeds to step 164, where the found vector index and the third slope are used to interpolate a value of the output (Yout) per equation (12), as follows:

$$Yout = \text{Third Slope} \times (Xin - \text{IndexVector(FoundIndex)}) + \text{OutputVector(FoundIndex)} \quad \text{Equation (12)}$$

where the third slope is computed (at step 158) as described above, and the other variables are described above with respect to equation (10). Again, Yout is the interpolated output value corresponding to the input value (Xin). Method 100 then ends at 170.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely non-limiting, exemplary implementations.

The various illustrative logical blocks and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. In the alternative, the processor and the storage medium may reside as discrete components.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method performed by a computer processor for searching an index vector (X) of a lookup table for a vector index that corresponds to an input value (Xin) that allows for the index vector (X) to be searched regardless of whether the lookup table is linearly index or piecewise indexed, and then executing either an interpolation routine for a linearly indexed vector or an interpolation routine for a piecewise indexed index vector to determine an interpolated output value (Yout) that corresponds to the input value(Xin), the computer processer programmed with instructions to perform the steps of the method, the method comprising the steps of:

computing, at the computer processor, based on the input value (Xin) being searched for within an index vector (X) of the lookup table, a value of the vector index to generate a computed vector index;

determining at the computer processor, whether the computed vector index is less than a length of an index vector (N);

when it is determined that the computed vector index is greater than the length of the index vector (N), re-computing at the computer processor, the computed vector index by decrementing the length of the index vector (N) by one to generate a re-computed vector index;

determining, at the computer processor, whether the value of the computed vector index is correct to determine whether the index vector (X) is linearly indexed or piecewise indexed;

when either the value of the computed vector index is determined to be correct or when the re-computed vector index is generated, executing at the computer processor, the interpolation routine for the linearly indexed index vector using a presently computed vector index to determine the interpolated output value (Yout) that corresponds to the input value (Xin), wherein the presently computed vector index is either the computed vector index or the re-computed vector index; and when the value of the computed vector index is determined to be incorrect and the index vector (X) is determined to be piecewise indexed, executing, at the computer processor, the interpolation routine for the piecewise indexed index vector to determine the interpolated output value (Yout) that corresponds to the input value (Xin).

2. A method according to claim 1, wherein computing the value of a vector index, comprises:

computing, based on the input value (Xin) being searched for within the index vector (X) and a cell difference (DiffX) between two consecutive cells of the index vector (X), the value of the vector index to generate the computed vector index.

3. A method according to claim 2, wherein computing the value of a vector index, comprises:

computing a ratio of (1) a difference between the input value (Xin) being searched for within the index vector (X) and a value of a first cell (X0) of the index vector (X) to (2) the cell difference (DiffX) between two consecutive cells of the index vector (X), wherein the computed vector index is an integer portion of the ratio.

4. A method according to claim 1, wherein determining whether the value of the computed vector index is correct, comprises:

determining whether the input value (Xin) is between: a first value of the index vector (X) evaluated the computed vector index; and a second value of the index vector (X) evaluated at the computed vector index incremented by one.

5. A method according to claim 4, further comprising:

determining that the index vector (X) is linearly indexed when it is determined that the input value (Xin) is between: the first value of the index vector (X) evaluated the computed vector index; and the second value of the index vector (X) evaluated at the computed vector index incremented by one.

6. A method according to claim 5, wherein executing the interpolation routine for the linearly indexed index vector, comprises:

determining whether a first condition is satisfied.

7. A method according to claim 6, wherein the first condition is whether a first difference between a first value and a second value is equal to a second difference between a third value and a fourth value, wherein the first value is the value of the index vector evaluated at the presently computed vector index plus 1 (IndexVector(Presentlycomputedvectorindex+1)), wherein the second value is the value of the index vector evaluated at the presently computed vector index (IndexVector(Presentlycomputedvectorindex)), wherein the third value is the value of cell one (X1) of the input vector (X), and wherein the fourth value is the value of cell zero (X0) of the input vector (X).

8. A method according to claim 6, further comprising:

computing a first slope when the first condition is satisfied; and interpolating, based on the presently computed vector index and the first slope, the interpolated, output value (Yout) that corresponds to the input value (Xin).

9. A method according to claim 8, wherein computing the first slope comprises:

computing the first slope to be a ratio of: (1) a first difference between cell one(Y1) of the output vector (Y) and cell zero (Y0) of the output vector (Y), and (2) a second difference between cell one (X1) of the input vector (X) and cell zero (X0) of the input vector (X).

10. A method according to claim 9, wherein interpolating the interpolated output value (Yout) that corresponds to the input value (Xin), comprises:

interpolating the interpolated output value (Yout) as the sum of:

cell zero (Y0) of the output vector (Y), and a product of the first slope and a difference between the input value (Xin) and the index vector evaluated at the presently computed vector index.

11. A method according to claim 6, further comprising:

computing a second slope when the first condition is not satisfied; and interpolating, based on the presently computed vector index and the second slope, the interpolated output value (Yout) that corresponds to the input value (Xin).

12. A method according to claim 11, wherein computing the second slope comprises:
computing the second slope to be a ratio of:
(1) a third difference between a value of the output vector (Y) evaluated at the presently computed vector index plus 1 (OutputVector(Presentlycomputedvectorindex+1)), and a value of the output vector (Y) evaluated at the presently computed vector index (OutputVector(Presentlycomputedvectorindex)), and
(2) a fourth difference between the first value of the index vector evaluated at the presently computed vector index plus 1 (IndexVector(Presentlycomputedvectorindex+1)) and the second value of the index vector evaluated at the presently computed vector index (IndexVector(Presentlycomputedvectorindex)).

13. A method according to claim 12, wherein interpolating the interpolated output value (Yout) that corresponds to the input value (Xin), comprises:
interpolating the interpolated output value (Yout) as the sum of:
the value of the output vector (Y) evaluated at the presently computed vector index (OutputVector(Presentlycomputedvectorindex)), and
a product of the second slope and a difference between the input value (Xin) and the index vector evaluated at the presently computed vector index.

14. A method according to claim 4, further comprising:
determining that the index vector (X) is piecewise indexed when it is determined that the input value (Xin) is not between: the first value of the index vector (X) evaluated the computed vector index; and the second value of the index vector (X) evaluated at the computed vector index incremented by one; and
wherein executing the interpolation routine for the piecewise indexed index vector, comprises:
searching for new vector index that upon being found is a found vector index;
computing a third slope based on the found vector index; and
interpolating, based on the found vector index and the third slope, the interpolated output value (Yout) that corresponds to the input value (Xin).

15. A method according to claim 14, wherein searching for new vector index that upon being found is a found vector index comprises:
determining whether the cell difference (DiffX) is greater than zero;
when it is determined that the cell difference (DiffX) is greater than zero, determining whether index vector evaluated at the computed vector index is less than the input value (Xin).

16. A method according to claim 15, when the index vector evaluated at the computed vector index is determined to be greater than the input value (Xin), further comprising:
performing a first piecewise search for the new vector index, wherein performing the first piecewise search comprises: starting at the computed vector index, and decrementing the vector index by one towards cell zero (X0) of the input vector (X) until a first found condition occurs at which point the new vector index is found, wherein the first found condition occurs when the input value (Xin) is determined to be greater than or equal to the index vector evaluated at the computed vector index or the vector index reaches zero (0); and
resetting the found vector index to the new vector index that was found.

17. A method according to claim 15, when the index vector evaluated at the computed vector index is determined to be less than the input value (Xin), further comprising:
performing a second piecewise search for the new vector index, wherein performing the second piecewise search comprises: starting at the computed vector index, incrementing the vector index by one towards cell N (XN) of the input vector (X) until a second found condition occurs at which point the new vector index is found, wherein the second found condition occurs when the input value (Xin) is determined to be less than or equal to the index vector evaluated at the computed vector index or the vector index reaches N; and
resetting the found vector index to the new vector index that was found minus one.

18. A method according to claim 15, when it is determined that the cell difference (DiffX) is less than zero, further comprising:
determining whether index vector evaluated at the computed vector index is greater than the input value (Xin).

19. A method according to claim 18, when the index vector evaluated at the computed vector index is determined to be less than the input value (Xin), further comprising:
performing a first piecewise search for the new vector index, wherein performing the first piecewise search comprises: starting at the computed vector index, and decrementing the vector index by one towards cell zero (X0) of the input vector (X) until a first found condition occurs at which point the new vector index is found, wherein the first found condition occurs when the input value (Xin) is determined to be greater than or equal to the index vector evaluated at the computed vector index or the vector index reaches zero (0); and
resetting the found vector index to the new vector index that was found.

20. A method according to claim 18, when the index vector evaluated at the computed vector index is determined to be greater than the input value (Xin), further comprising:
performing a second piecewise search for the new vector index, wherein performing the second piecewise search comprises: starting at the computed vector index, incrementing the vector index by one towards cell N (XN) of the input vector (X) until a second found condition occurs at which point the new vector index is found, wherein the second found condition occurs when the input value (Xin) is determined to be less than or equal to the index vector evaluated at the computed vector index or the vector index reaches N; and
resetting the found vector index to the new vector index that was found minus one.

21. A method according to claim 14, wherein computing the third slope based on the found vector index; and
computing the third slope to be a ratio of:
(1) a fifth difference between a value of the output vector (Y) evaluated at the found vector index plus 1 (OutputVector(FoundIndex+1)), and a value of the output vector (Y) evaluated at the found vector index (OutputVector(FoundIndex)), and
(2) a sixth difference between a first value of the index vector evaluated at the found vector index plus 1 (IndexVector(FoundIndex+1)) and a second value of the index vector evaluated at the found vector index (IndexVector(FoundIndex)).

22. A method according to claim 14, wherein interpolating the interpolated output value (Yout) that corresponds to the input value (Xin), comprises:
    interpolating the interpolated output value (Yout) as the sum of:
        the value of the output vector (Y) evaluated at the found vector index (OutputVector(FoundIndex)), and
        a product of the third slope and a difference between the input value (Xin) and the index vector evaluated at the found vector index.

23. A method according to claim 1, wherein cells of a linearly indexed index vector (X) are evenly spaced such that the difference between any two consecutive cells of the linearly indexed index vector (X) is always the same, and
    wherein cells of a piecewise indexed index vector (X) are unevenly spaced such that a difference between the two consecutive cells of the piecewise indexed index vector (X) is different than a difference between another two consecutive cells of the piecewise indexed index vector (X).

\* \* \* \* \*